United States Patent [19]

Christine et al.

[11] Patent Number: 4,964,944
[45] Date of Patent: Oct. 23, 1990

[54] APPARATUS FOR SEALING AND SEVERING A WEB OF FILM

[75] Inventors: William C. Christine, Catasauqua, Pa.; Steffen Lyons, Libertyville, Ill.; John Posey, McHenry, Ill.; Schmidt, Josef, Libertyville, Ill.; George J. Herschman, Bath, Pa.

[73] Assignee: Baxter International Inc., Deerfield, Ill.

[21] Appl. No.: 889,714

[22] Filed: Jul. 28, 1986

[51] Int. Cl.$^5$ .............................................. B32B 31/18
[52] U.S. Cl. ..................................... 156/515; 156/251; 156/530
[58] Field of Search ................. 156/251, 515, 530; 493/189, 203, 206, 207, 209; 53/373, 477

[56] References Cited

U.S. PATENT DOCUMENTS

| | | | |
|---|---|---|---|
| 2,941,575 | 6/1960 | Malmberg et al. | 156/515 |
| 3,010,866 | 11/1961 | Douchet | 156/530 |
| 3,425,185 | 1/1969 | Samways et al. | 53/82 |
| 3,473,995 | 10/1969 | Schott, Jr. | 156/513 |
| 3,488,914 | 1/1970 | Csernak | 53/96 |
| 3,492,783 | 2/1970 | Dohmeier . | |
| 3,551,259 | 12/1970 | Schwarzkopf | 156/515 |
| 3,574,039 | 4/1971 | Fehr et al. | 156/515 |
| 3,593,000 | 7/1971 | Forma | 156/515 |
| 3,599,387 | 8/1971 | James . | |
| 3,700,388 | 10/1972 | Johnson et al. | 198/178 |
| 3,775,225 | 11/1973 | Schott, Jr. | 156/510 |
| 3,830,681 | 8/1974 | Wilson | 156/583 |
| 3,845,606 | 11/1974 | Wilson . | |
| 3,894,381 | 7/1975 | Christine et al. . | |
| 3,925,139 | 12/1975 | Simmons | 156/358 |
| 3,992,981 | 11/1979 | Stock | 156/515 |
| 4,105,489 | 8/1978 | Lotto | 156/510 |
| 4,136,505 | 1/1979 | Putnam, Jr. et al. | 53/551 |
| 4,171,605 | 10/1979 | Putnam, Jr. et al. | 53/552 |
| 4,221,101 | 9/1980 | Woods | 53/79 |
| 4,306,400 | 12/1981 | Coleman et al. | 53/373 |
| 4,387,547 | 6/1983 | Reil | 53/131 |
| 4,433,527 | 2/1984 | Ramsey et al. | 53/548 |
| 4,451,249 | 5/1984 | deBin | 493/204 |
| 4,463,542 | 8/1984 | Greenawalt et al. | 53/479 |
| 4,510,736 | 4/1985 | Muller | 53/567 |
| 4,512,138 | 4/1985 | Greenawalt | 53/451 |
| 4,524,567 | 6/1985 | Patelli | 53/552 |
| 4,529,472 | 7/1985 | Hsu | 156/498 |
| 4,532,753 | 8/1985 | Kovacs | 53/451 |
| 4,630,429 | 12/1986 | Christine | 156/515 |

FOREIGN PATENT DOCUMENTS

| | | |
|---|---|---|
| 2520687 | 11/1976 | Fed. Rep. of Germany . |
| 3425430 | 1/1986 | Fed. Rep. of Germany ...... 156/515 |
| 1316171 | 12/1962 | France . |
| 1090575 | 11/1967 | United Kingdom . |

*Primary Examiner*—Caleb Weston
*Attorney, Agent, or Firm*—Paul E. Schaafsma; Paul C. Flattery; Robert M. Barrett

[57] ABSTRACT

An apparatus for sealing and severing a web of film. The apparatus includes a first jaw located on one side of the web of film and a second jaw located on a second side of the web of film. The first and second jaws cooperate to grip the web of film. Located within the first jaw is a heater member for sealing and severing the web of film. The heater member is secured so that the time and/or pressure at which the heater member engages the web of film may be varied independent of the first jaw.

25 Claims, No Drawings

APPARATUS FOR SEALING AND SEVERING A WEB OF FILM

BACKGROUND OF THE INVENTION

The present invention relates to an apparatus for sealing and severing a web of film. More specifically, the present invention relates to an apparatus for creating side seals in a web of film in a form, fill and seal packaging machine and for severing the web of film between the side seals.

Typically, form, fill and seal packaging machines are utilized to package a product in a flexible container. To this end, form, fill and seal packaging machines are used to seal pharmaceuticals, dairy products, wine, food stuffs, cosmetics, and other products in flexible containers. The form, fill and seal packaging machine provides an apparatus for packaging these products in an expedient manner.

In one type of form, fill and seal packaging machine a web of heat-sealable film is passed over a former or mandrel that forms the film into a tubular shape. To effect a tubular shape, the film is folded longitudinally and heat sealed along abutting longitudinal edges. The tubular shaped film is then passed around a tubular fill system that deposits the product to be packaged into the tubular shaped film. To create individual packages (hereinafter "bags") the web of film must be sealed across its width. The side seals are typically created by a sealer that creates the second seal for one bag while making the first seal for the next bag. After the side seals are created, the web of film may then be severed between the seals to create individual bags.

One method of creating the side seals in the web of film is to utilize a hot bar. The hot bar is secured to a set of jaws that are hydraulically actuated to grip the web of film. As the jaws grip the web of film the hot bar is urged against the web of film melting a portion of the web of film onto itself. Typically, after the hot bar has melted the web of film a knife is actuated and severs the web of film between the seals to create a flexible bag.

In the embodiment of the form, fill and seal packaging machine set forth above, the time and pressure at which the hot bar is urged against the web of film is determined by the jaws. Because the hot bar is secured to and actuated with the jaws, the pressure at which the jaws are urged against the web of film is the pressure at which the hot bar is urged against the web of film. In a similar vein, the time during which the hot bar engages the film is determined by the time the jaws engage the film. Accordingly, it is not possible to independently vary the time and pressure the hot bar engages the web of film.

As set-forth above, it is common for the web of film to be severed between side seals by an actuated knife. Typically, this method of severing the web of film results in an excess amount of waste, i.e., excess film being located on the sides of the bag created.

Accordingly, there is a need for an improved apparatus for sealing and severing a web of film.

SUMMARY OF THE INVENTION

The present invention provides an apparatus for sealing and severing a web of film. The apparatus includes a first jaw located on one side of the web of film and a second jaw located on a second side of the web of film. The first and second jaws cooperate to grip the web of film. Located within the first jaw is a heater member for sealing and severing the web of film. The heater member is secured so that the time and/or pressure at which the heater member engages the web of film may be varied independent of the first jaw.

Preferably, the heater member includes an impulse heating element that includes a hollow tube enclosed by a cover.

Preferably, the heater member is secured to a yoke that is secured to at least one air cylinder.

Preferably, the second jaw includes a back-up member and each jaw includes two gripper members. Most preferably, one of the gripper members is wider than the other.

Accordingly, it is an advantage of the present invention to provide an apparatus for sealing and severing a web of film in a form, fill and seal packaging machine.

A further advantage of the present invention is to provide an apparatus that seals and severs a web of film in the same step of the process.

Another advantage of the present invention is to provide an apparatus that allows the user to independently vary the time and/or pressure at which the sealing and severing member engages the web of film with respect to the jaws and gripper members.

Moreover, an advantage of the present invention is to provide an impulse system in which the impulse wire is thermally and electrically isolated.

Furthermore, an advantage of the present invention is that the pressure at which the jaws grip the web of film can be independently varied from the pressure at which the sealing and severing apparatus engages the web of film.

A further advantage of the present invention is that the time the jaws contact the web of film can be varied from the time the sealing and securing apparatus contacts the web of film.

Another advantage of the present invention is that the gripper members of the present apparatus securely grip the film so that even though the film may be almost immediately cut it is forced against the heating element to provide a good seal.

A still further advantage of the present invention is that the sealing and severing apparatus is isolated from the mechanical squeezing of the jaws.

Moreover, an advantage of the present invention is that the apparatus provides a seal that minimizes the amount of material waste, i.e., excess material located at the side seals.

Furthermore, an advantage of the present invention is that the sealing and severing apparatus can easily be changed or replaced.

Another advantage of the present invention is that the sealing and severing apparatus may be utilized as either an impulse or hot bar sealing system.

Moreover, an advantage of the present invention is that the sealing and severing apparatus can create a variety of seals on a variety of film types.

Additional features and advantages are described in, and will be apparent from, the detailed description of the presently preferred embodiments and from the drawings.

DETAILED DESCRIPTION OF THE PRESENTLY PREFERRED EMBODIMENTS

Figure 1:
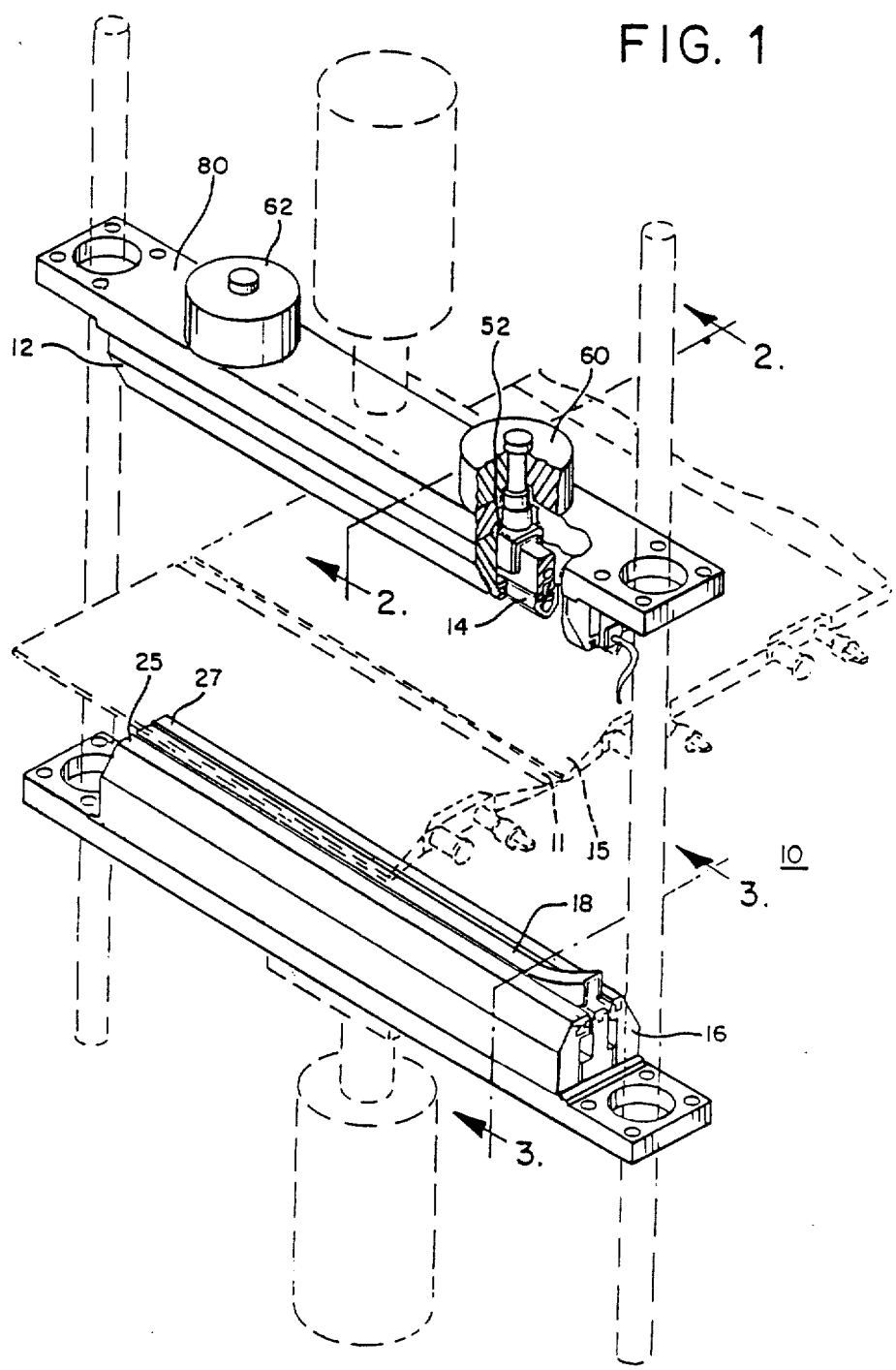
FIG. 1 illustrates a top elevational view of the sealing and severing apparatus of the present invention with the web of film illustrated in phantom lines.

Referring to FIG. 1, the sealing and severing apparatus 10 of the present invention is illustrated. The sealing and severing apparatus 10 is preferably designed for use in a form, fill and seal packaging machine (not shown) to create a bag filled with a product.

As used herein, the term "form, fill and seal packaging machine" means a packaging machine for creating from a web of film a bag filled with a product. In a typical form, fill and seal packaging machine the web of film is folded along abutting longitudinal edges and sealed onto itself. The film is then filled with a product and side seals are created. Of course, the sealing apparatus 10 of the present invention can be used on other packaging machines or with other apparatus to seal and sever a web of film.

The sealing and severing apparatus 10 includes a first jaw 12 that includes a heater member 14 and a second jaw 16 that includes a back-up member 18. As discussed in detail below, the heater member 14 functions to melt a portion of the web of film 15 so that the web of film is sealed between side seals 11, and the back-up member 18 functions to urge the web of the film against the heater member 14.

As illustrated, the first jaw 12 and second jaw 16 are located on opposite sides of the web of film 15, diametric each other, i.e., facing each other. The jaws 12 and 16 function, in part, to grip the web of film 15 so that the film can be sealed. To this end, the jaws 12 and 16 are hydraulically actuated and are simultaneously raised and lowered with respect to the web of film 15.

Figure 2:
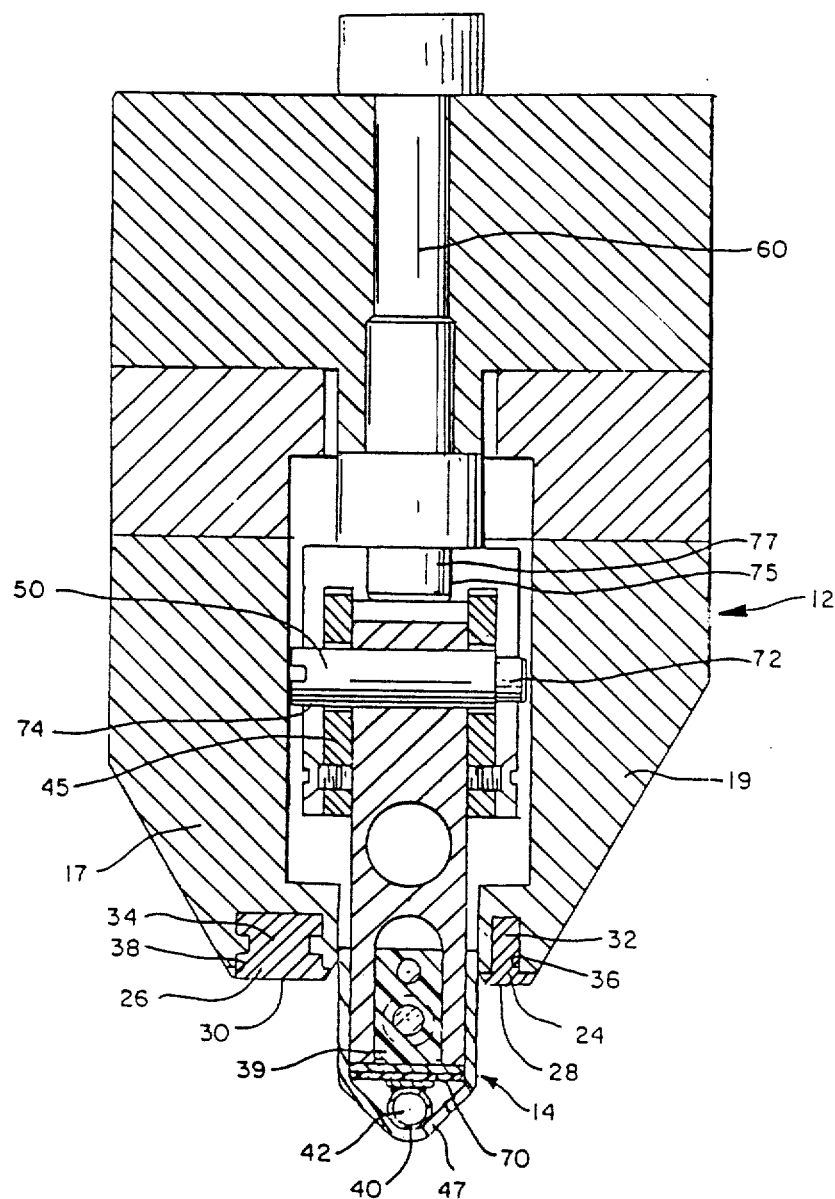
FIG. 2 illustrates a cross-sectional view of the first set of jaws and the apparatus for sealing and severing the web of film taken along lines 2—2 of FIG. 1.
Figure 3:
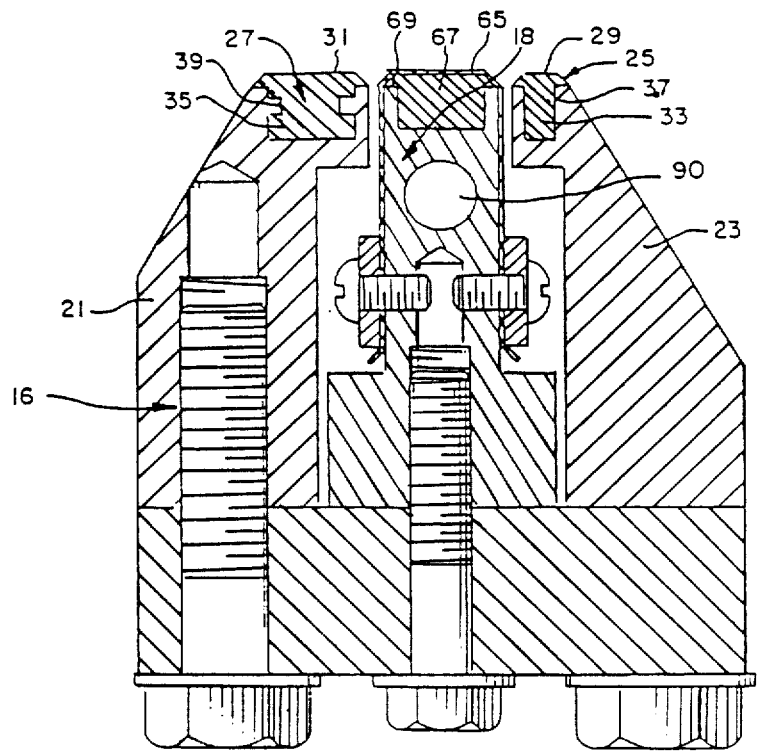
FIG. 3 illustrates a cross-sectional view of the second set of jaws and back-up member taken along lines 3—3 of FIG. 1.

As illustrated in FIGS. 2 and 3, the jaws 12 and 16 each include a pair of gripper members 24, 26 and 25, 27 respectively. The gripper members 24, 26 and 25, 27 function, in principal part, to clamp the layers of film 15 into intimate contact with each other so that the film can be sealed and severed. This is essential to prevent slippage of the web of film 15 as the sealing and severing apparatus 10 seals and severs the film to create individual bags.

The gripper members 24, 26 and 25, 27 are preferably constructed from an elastomeric material. It has been found that gripper members 24, 26 and 25, 27 constructed from high tear strength silicone with a 50-70 Shore A durometer function satisfactorily.

The gripper members 24, 26 and 25, 27 include a flat top portion 28, 30 and 29, 31 respectively, and a body portion 32, 34 and 33, 35 respectively. The body portions 32, 34 and 33, 35 are secured within anchor holes 36 and 38 in the first jaw 12 and 37 and 39 in the second jaw 16. To insure that the gripper members 24, 26 and 25, 27 are not ripped out of the jaws 12 and 16 the gripper members are vulcanized to the jaws 12 and 16 respectively. Due to this construction, e.g. because of the flat surfaces 28, 30 and 29, 31 and vulcanization, the rate of failure for the gripper members 24, 26 and 25, 27 is very low. This is in contrast to some prior gripper members for sealing apparatus which cracked or were pulled out of the jaws at relatively frequent intervals.

As illustrated, each set of jaws 12 and 16 includes a first and second jaw member: the first set of jaws 12 includes a first jaw member 17 and second jaw member 19; and the second set of jaws 16 includes a first jaw member 21 and a second jaw member 23. As further illustrated, the first jaw member 17 of the first set of jaws 12 and the first jaw member 21 of the second set of jaws 17 each have a gripper member 26 and 27 that is somewhat wider than the corresponding gripper member 24 and 25 in the second jaw member 19 and 23. Because the web of film is not only sealed and severed at this station but also filled, it is necessary for the second jaw member 19 and 23 to have a gripper member 25 and 27 that grips a minimal amount of surface area of the web of film 15. If too much surface area of the film 16 is gripped at the filling station it is possible to break the web of film. Because the first jaw member 17 and 21 may function, in part, to advance the web of film 15 through the sealing station it is necessary for the first gripper members 24 and 25 to be of a somewhat greater size than the corresponding gripper members 26 and 27.

Referring now to FIG. 2, the heater member 14 is illustrated. The heater member 14 functions to heat the web of film 15 so that it is sealed to itself. The heater member 14 includes a heating element 40. The heating element 40 preferably is a hollow stainless steel element. In one embodiment, the heating element 40 is a 16 gauge needle cannula. However, the heating element 40 may be any impulse element known in the art.

The heating element 40 includes a hollow cylindrical cavity 42 in which is inserted a thermocouple (not shown). Accordingly, the thermocouple directly monitors the temperature of the heating element 40. The thermocouple may be any thermocouple known in the art. Preferably the thermocouple is a 10 mil conductor wire type J with a teflon coating. It has been found that a thermocouple with a 45/1000 inch outer diameter functions satisfactorily with a 16 gauge needle cannula heating element 40.

The heating element 40 is silver soldered to an electrical contact pad (not shown). Preferably, the heating element 40 is situated on a insulating layer 70. Preferably, the insulating layer 70 comprise two 10 mil layers of pressure sensitive high temperature glass reinforced teflon. The insulating layer 70 can of course be any insulating material, e.g., a ceramic insulator. Because the teflon is pressure sensitive, it is easily secured to the body 39 of the heating member 14. Accordingly, the heating element 40 is thermally and electrically isolated from the body 39 of the heating member 14.

The heating element 40 is enclosed by a cover 47. Preferably, the cover 47 comprises one six mil layer of glass reinforced teflon cloth.

Although the heating element 40 includes an impulse element, because the element is thermally and electrically isolated it has characteristics that differ from classical impulse type system. Between firings of the impulse element 40, because of the thermal and electrical isolation, the heating element 40 only loses approximately 25° to about 50° F. Accordingly, the heating element 40 exhibits characteristics of both a static hot bar system and an impulse hot bar system.

The heater element 40 may be attached to the heater member 14 by a spring loaded guide assembly (not shown). The spring loaded guide assembly compensates for the thermal expansion of the heating element 40. To this end, the heating element is soldered to the electrical contact that is in turn secured to the spring loaded guide assembly. The spring loaded guide assembly includes a spring insulator block, and a controlled path of limited expansion, e.g., a rod. A spring tensioning system available from Vertrod has been found to function satisfactorily as the spring loaded guide assembly.

The heater member 14 is secured to two yokes (only yoke 52 is illustrated; both yokes have the same construction). The yokes 52 include two apertures 72 and 74 which correspond to an aperture 71 in the heater member 14. Accordingly, the heater member 14 is secured to the yokes 52 by pivot pins 50 that are received within the apertures 72, 74 and 71. Accordingly, the heater member 14 may be easily removed or changed by removing the two pivot pins 50 from the apertures in the heater member 14 and yokes 52.

Preferably, thermal insulation blocks 45 are mechanically secured to the body 39 of the heater member 14 between the yokes 52. The thermal insulation block 45 can be constructed from any thermal insulating material known in the art. It has been found that machinable glass ceramic manufactured by Corning Glass functions satisfactorily as a thermal insulating material.

The yokes 52 are in turn secured to two air cylinders 60 and 62. To this end, the yokes 52 include an aperture 75 that allows the yokes to receive a portion 77 of the air cylinder. Because the heater member 14 is attached by yokes 52 the heater member is pivotally coupled to the air cylinders 60 and 62. The air cylinders 60 and 62 allow one to independently vary the pressure and/or time at which the heater member 14 contacts the web of film 15. Accordingly, the forces of the heater member 14 are isolated from the forces exerted by the gripper member 25, 27 and 26, 28 on the web of film 15.

Moreover, by utilizing the yokes 52 and air cylinders 60 and 62 it is possible to vary the height of the heater member 14 with respect to the web of film 15. Accordingly, the heater member 14 will not necessarily be stationary with respect to the jaw member 12. Furthermore, the yokes 52 insure that the heater member 14 is in a correct position with respect to the web of film 15. Because one can vary the time and pressure at which the heater member 14 contacts the web of film 15 it provides the user with the ability to use a variety of types of films and vary the seals that are created.

The heater member 14 is coupled to the jaw member 12 by the air cylinders 60 and 62 being coupled to the same plate 80 as the jaw member 12.

Due to the construction of the heating element 40, the heater member 14 seals and severs the web of film 15 in one step. Moreover, due to the size of the heating element 40, the side seals 11 created are minimal. It has been found that with a heating element 40 comprising a 16 guage cannula, the side seals of the bag created have a width of approximately 1/16 to 3/32 of an inch. This provides one with more internal volume within the bag created as well as with a construction that does not include an excess of waste film. Moreover, it has been found that the side seals created are as strong as wider seals.

Referring now to FIG. 4, the back-up bar 18 is illustrated. The back-up bar 18 functions to provide a means against which the web of film 15 is urged by the heater member 14. To this end, the back-up bar 18 includes an elastomeric member 65 against which the web of film 15 and the heating element 40 are urged. The elastomeric member 65 is preferably constructed from a high temperature high tear silicone with a Shore A durometer of 50-70. Preferably the elastomeric member 65 includes a body member 67 that is received within a slot 69 in the back-up member 18. Preferably the elastomeric member 65 is also vulcanized to the back-up member 18.

The back-up member 18 may also include a channel 90. The channel 90 may include a fluid, such as water, for controlling the temperature of back-up member 18. The remaining portions of the back-up member 18 are preferably constructed from a metal, preferably, anodized aluminum.

In use, the jaws 12 and 16 come together and grip the web of film 15 between the grippers 25, 27 and 26, 28. As the jaws 12 and 16 are moved into close proximity to each other, a proximity switch (not illustrated) is actuated. The actuation of the proximity switch fires the heating element 40. The heating element 40 is fired for approximately one-half to about one second. Preferably the heating element 40 is fired as it touches the web of film 15 for three-quarters of a second.

The heating element 40 i fired to a temperature at least equal to the melting point of the web of film 15. As the heating element 40 contacts the web of film 15 the film is severed between the gripping members 25, 27 and 26, 28. Due to the construction of the gripping members 25, 27 and 26, 28, the web of film 15 is urged against the heating element 40 even though the web of film has been severed. After the heating element 40 contacts the web of film 15, the system dwells for approximately three-quarters to about one second. The jaws 12 and 16 then open releasing the web of film 15. Accordingly, the side seals 11 are effectuated on the web of film 15 and a flexible bag is created.

It should be noted, that the heater member 14 can either be fixed in an extend position or move towards the web of film 15 as the jaws 12 and 16 come together. Even if the heater member 14 is extended, the user can still vary the pressure at which the heating element 40 engages the web of film 15 with respect to the jaws 12 and 16 because the air cylinders 60 and 62 act as an air spring.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for sealing and severing a web of film comprising:
   a first jaw located on a first side of the web of film;
   a second jaw located on a second side of the web of film;
   the first and second jaws cooperating to grip the web of film; and
   means for sealing and contemporaneously severing the web of film located within the first jaw, including means for varying independent of the first jaw the pressure, at which the means for sealing and contemporaneously severing engages the web of film.

2. The apparatus of claim 1 wherein said means for sealing and severing includes an impulse wire.

3. The apparatus of claim 1 wherein the means for varying the pressure includes at least one air cylinder.

4. The apparatus of claim 1 wherein the means for sealing and severing the web of film is removably secured to the means for varying independent of the first jaw.

5. The apparatus of claim 1 wherein the second jaw has secured thereto a back-up member.

6. The apparatus of claim 5 wherein the back-up member includes an elastomeric pad.

7. The apparatus of claim 1 wherein:
the first set of jaws includes a first and second gripper member; and
the second set of jaws includes a corresponding set of gripper members.

8. The apparatus of claim 7 wherein the first gripper member of the first and second jaws is wider than the second gripper member of the first and second jaws.

9. An apparatus for sealing and severing a web of film comprising:
a first jaw located on a first side of the web of film;
a second jaw located on a second side of the web of film;
the first and second jaws cooperating to grip the web of film;
means for sealing and severing the web of film located within the first jaw, including means for varying independent of the first jaw the pressure at which the means for sealing and severing engages the web of film; and
the means for independently varying the pressure includes at least two yokes and two air cylinders.

10. An apparatus for sealing and contemporaneously severing a web of film comprising:
a first jaw located on a first side of the web of film;
a second jaw located on a second side of the web of film;
the first and second jaws cooperating to grip the web of film; and
means for sealing and contemporaneously severing the web of film located within the first jaw, including means for varying independent of the first jaw at least one of the time and pressure, at which the means for sealing and contemporaneously severing engages the web of film, said means for sealing and contemporaneously severing includes a cannula.

11. The apparatus of claim 10 including a thermocouple located within the cannula.

12. The apparatus of claim 10 wherein the cannula is covered by a teflon cloth.

13. An apparatus for sealing and severing a web of film comprising:
a first jaw located on a first side of the web of film including a first and second gripper member, the first jaw being secured to a first plate;
a second jaw located on a second side of the web of film including a first and second gripper member corresponding to the first and second gripper member of the first jaw, the second jaw being secured to a second plate;
means for sealing and severing the web of film located within the first jaw, including means for varying independent of the first jaw at least one of the time and pressure, at which the means for sealing and severing engages the web of film, the means for varying includes at least one air cylinder secured to the first plate and a yoke secured to the means for sealing and severing and pivotally coupled to the air cylinder; and
a back-up bar located with the second jaw.

14. The apparatus of claim 13 wherein the means for sealing and severing includes a substantially hollow tube.

15. The apparatus of claim 13 wherein the first gripper member of the first and second set of jaws is wider than the second gripper member of the first and second set of jaws.

16. The apparatus of claim 13 wherein the means for sealing and severing includes an impulse system.

17. An apparatus for sealing a web of film comprising:
a first jaw located on a first side of the web of film including a first and second gripper member;
a second jaw located on a second side of the web of film including a first and second gripper member corresponding to the first and second gripper member of the first jaw;
means for sealing the web of film located within the first jaw, including means for varying independent of the first jaw the pressure, at which the means for sealing engages the web of film, the means for sealing including a hollow tube; and
a back-up bar located within the second jaw.

18. The apparatus of claim 17 wherein the means for sealing and severing includes a cover.

19. The apparatus of claim 18 wherein the cover is constructed from teflon.

20. An apparatus for creating from a web of film a flexible bag, the apparatus including an apparatus for sealing and severing the web of film to create side seals in the film comprising:
a first jaw located on a first side of the web of film including a first and second gripper member;
a second a jaw located on a second side of the web of film including a first and second gripper member corresponding to the first and second gripper member of the first jaw;
a heater member located within the first jaw, the heater member including a hollow heating element for contemporaneously severing and sealing the web of film;
a back-up member located in the second jaw; and
means for varying independent of the first jaw at least one of the time or pressure at which the heater member contacts the web of film.

21. The apparatus of claim 20 wherein the heating element includes a thermocouple.

22. The apparatus of claim 20 wherein the heater member includes a cover for covering the heating element.

23. The apparatus of claim 20 wherein the first grippers of the first and second jaws are wider than the second grippers of the first and second jaws.

24. The apparatus of claim 20 wherein the means for varying is an air spring.

25. An apparatus for sealing and severing a web of film comprising:
a first jaw located on a first side of the web of film including a first and second gripper member;
a second jaw located on a second side of the web of film including a first and second gripper member corresponding to the first and second gripper member of the first jaw;
a heater member located within the first jaw, the heater member including a hollow heating element for sealing and severing the web of film, the heater member is secured to means for varying independent of the first jaw the time and pressure at which the heating element engages the web of film;
a back-up member located within the second jaw; and
the means for varying includes at least one yoke secured to the heating element and at least one air cylinder secured to the yoke.

* * * * *

UNITED STATES PATENT AND TRADEMARK OFFICE
CERTIFICATE OF CORRECTION

PATENT NO. : 4,964,944

DATED : October 23, 1990

INVENTOR(S) : William C. Christine, et al.

Page 1 of 5

It is certified that error appears in the above-identified patent and that said Letters Patent is hereby corrected as shown below:

Title page:

The sheets of drawings consisting of figs. 1, 2, and 3, should be added as shown on the attached sheets.

Signed and Sealed this

Twelfth Day of May, 1992

Attest:

DOUGLAS B. COMER

Attesting Officer

Acting Commissioner of Patents and Trademarks

United States Patent [19]

Christine et al.

[11] Patent Number: 4,964,944
[45] Date of Patent: Oct. 23, 1990

[54] APPARATUS FOR SEALING AND SEVERING A WEB OF FILM

[75] Inventors: William C. Christine, Catasauqua, Pa.; Steffen Lyons, Libertyville, Ill.; John Posey, McHenry, Ill.; Schmidt, Josef, Libertyville, Ill.; George J. Herschman, Bath, Pa.

[73] Assignee: Baxter International Inc., Deerfield, Ill.

[21] Appl. No.: 889,714

[22] Filed: Jul. 28, 1986

[51] Int. Cl.⁵ .............................................. B32B 31/18
[52] U.S. Cl. .................................... 156/515; 156/251; 156/530
[58] Field of Search ................... 156/251, 515, 530; 493/189, 203, 206, 207, 209; 53/373, 477

[56] References Cited

U.S. PATENT DOCUMENTS

| | | | |
|---|---|---|---|
| 2,941,575 | 6/1960 | Malmberg et al. | 156/515 |
| 3,010,866 | 11/1961 | Douchet | 156/530 |
| 3,425,185 | 1/1969 | Samways et al. | 53/82 |
| 3,473,995 | 10/1969 | Schott, Jr. | 156/513 |
| 3,488,914 | 1/1970 | Csernak | 53/96 |
| 3,492,783 | 2/1970 | Dohmeier | |
| 3,551,259 | 12/1970 | Schwarzkopf | 156/515 |
| 3,574,039 | 4/1971 | Fehr et al. | 156/515 |
| 3,593,000 | 7/1971 | Forma | 156/515 |
| 3,599,387 | 8/1971 | James | |
| 3,700,388 | 10/1972 | Johnson et al. | 198/178 |
| 3,775,225 | 11/1973 | Schott, Jr. | 156/510 |
| 3,830,681 | 8/1974 | Wilson | 156/583 |
| 3,845,606 | 11/1974 | Wilson | |
| 3,894,381 | 7/1975 | Christine et al. | |
| 3,925,139 | 12/1975 | Simmons | 156/358 |
| 3,992,981 | 11/1979 | Stock | 156/515 |
| 4,105,489 | 8/1978 | Lotto | 156/510 |
| 4,136,505 | 1/1979 | Putnam, Jr. et al. | 53/551 |
| 4,171,605 | 10/1979 | Putnam, Jr. et al. | 53/552 |
| 4,221,101 | 9/1980 | Woods | 53/79 |
| 4,306,400 | 12/1981 | Coleman et al. | 53/373 |
| 4,387,547 | 6/1983 | Reil | 53/131 |
| 4,433,527 | 2/1984 | Ramsey et al. | 53/548 |
| 4,451,249 | 5/1984 | deBin | 493/204 |
| 4,463,542 | 8/1984 | Greenawalt et al. | 53/479 |
| 4,510,736 | 4/1985 | Muller | 53/567 |
| 4,512,138 | 4/1985 | Greenawalt | 53/451 |
| 4,524,567 | 6/1985 | Patelli | 53/552 |
| 4,529,472 | 7/1985 | Hsu | 156/498 |
| 4,532,753 | 8/1985 | Kovacs | 53/451 |
| 4,630,429 | 12/1986 | Christine | 156/515 |

FOREIGN PATENT DOCUMENTS

| | | |
|---|---|---|
| 2520687 | 11/1976 | Fed. Rep. of Germany . |
| 3425430 | 1/1986 | Fed. Rep. of Germany ...... 156/515 |
| 1316171 | 12/1962 | France . |
| 1090575 | 11/1967 | United Kingdom . |

Primary Examiner—Caleb Weston
Attorney, Agent, or Firm—Paul E. Schaafsma; Paul C. Flattery; Robert M. Barrett

[57] ABSTRACT

An apparatus for sealing and severing a web of film. The apparatus includes a first jaw located on one side of the web of film and a second jaw located on a second side of the web of film. The first and second jaws cooperate to grip the web of film. Located within the first jaw is a heater member for sealing and severing the web of film. The heater member is secured so that the time and/or pressure at which the heater member engages the web of film may be varied independent of the first jaw.

25 Claims, 3 Drawing Sheets

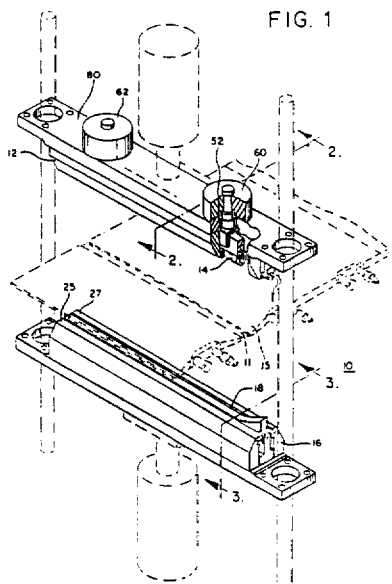

FIG. 1